No. 759,329. PATENTED MAY 10, 1904.
L. THORNBURG.
GLASS DRAWING APPARATUS.
APPLICATION FILED APR. 25, 1903.
NO MODEL. 2 SHEETS—SHEET 1.

WITNESSES INVENTOR

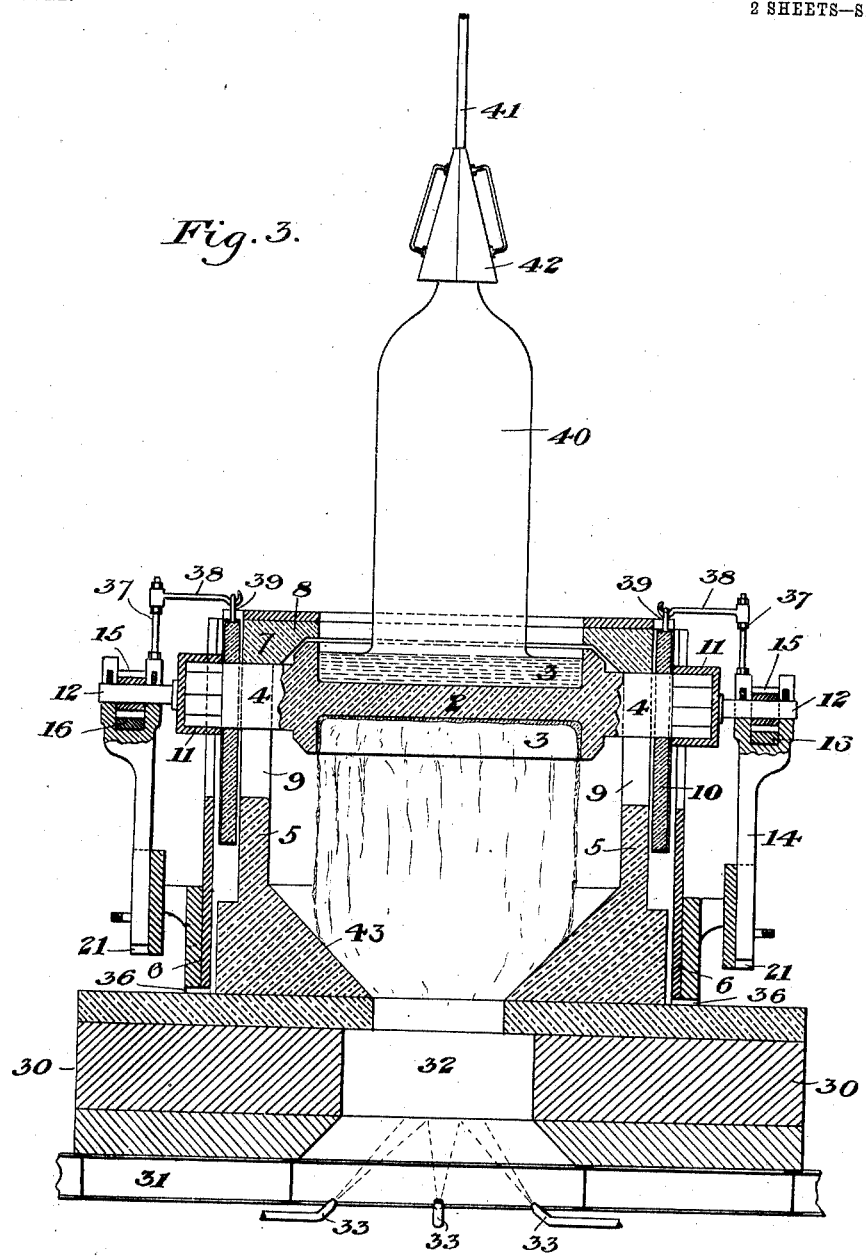

No. 759,329. Patented May 10, 1904.

UNITED STATES PATENT OFFICE.

LINCOLN THORNBURG, OF GAS CITY, INDIANA, ASSIGNOR TO THE WINDOW GLASS MACHINE COMPANY, OF PITTSBURG, PENNSYLVANIA, A CORPORATION OF NEW JERSEY.

GLASS-DRAWING APPARATUS.

SPECIFICATION forming part of Letters Patent No. 759,329, dated May 10, 1904.

Application filed April 25, 1903. Serial No. 154,272. (No model.)

*To all whom it may concern:*

Be it known that I, LINCOLN THORNBURG, of Gas City, Grant county, Indiana, have invented a new and useful Glass-Drawing Apparatus, of which the following is a full, clear, and exact description, reference being had to the accompanying drawings, forming part of this specification, in which—

Figure 1:
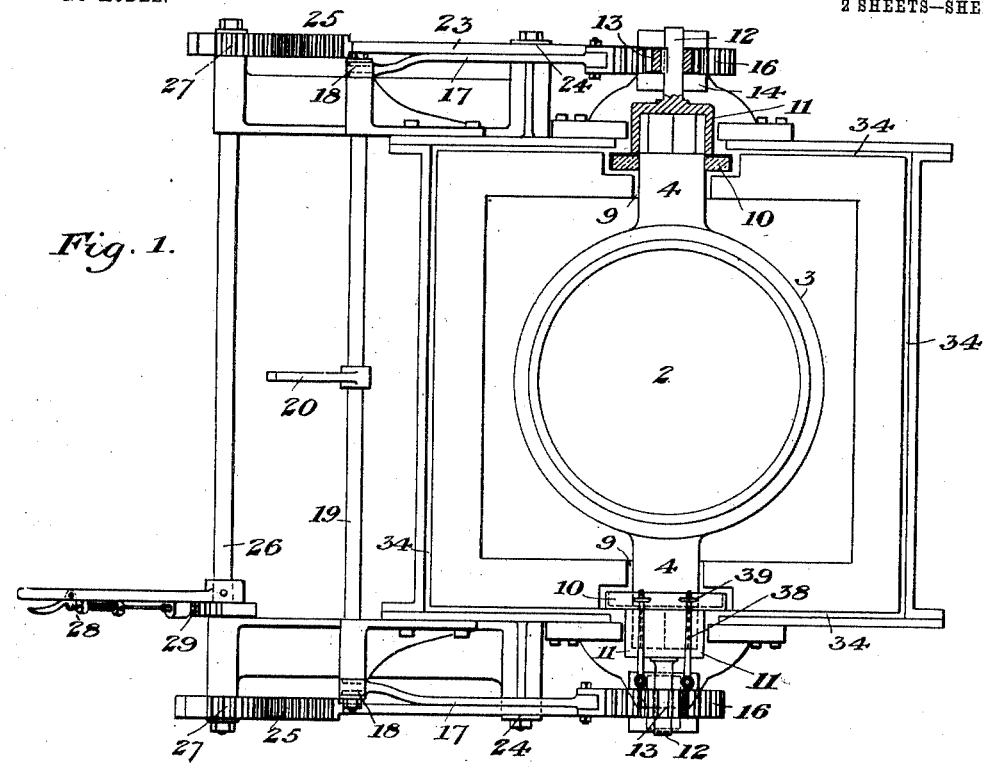
Figure 2:
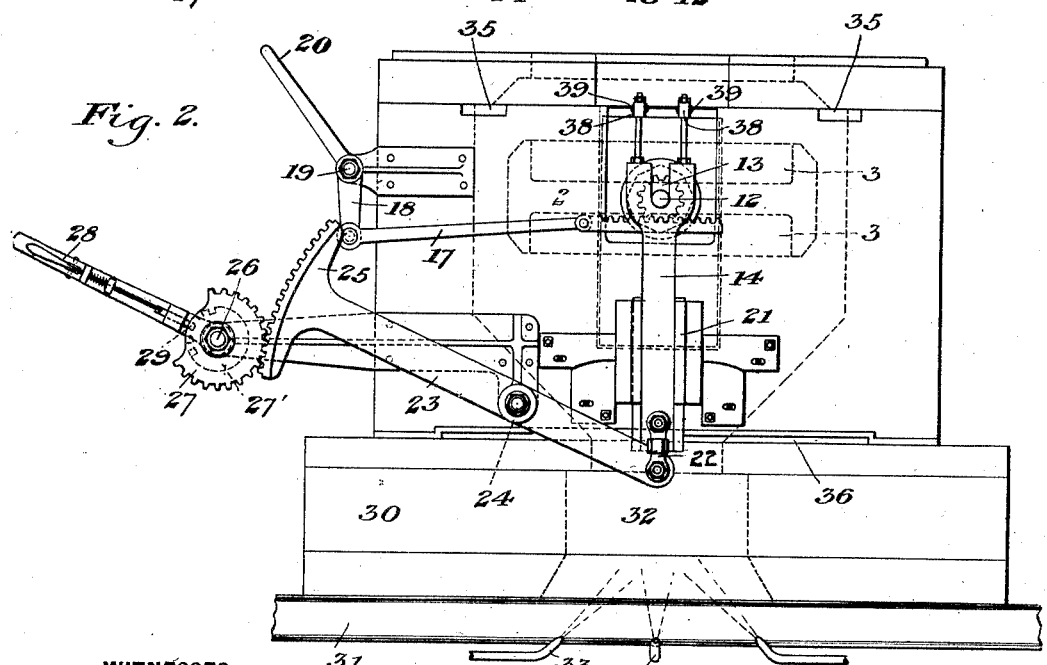

Figure 1 is a plan view, partly broken away, showing a glass-drawing apparatus constructed in accordance with my invention. Fig. 2 is a side elevation of the same, and Fig. 3 is a vertical transverse section showing the operation of drawing.

My invention relates to the drawing of glass from pots or receptacles into which the glass is fed; and its object is to increase the output, to provide for removing the glass remaining in the pot after drawing, and to provide simple and effective mechanism for raising and lowering the pot and for turning it over to discharge the glass, as well as for heating the turned-over pot to melt out the glass.

In the drawings, in which I show a preferred form of my apparatus, 2 represents a turning pot, which I have shown as double in form, having opposite cavities 3 3 for receiving the glass, so that one is upside down while the drawing operation is being carried out from the upper one. This pot is preferably formed in one integral piece of clay, with projecting integral side trunnions 4 4, preferably polygonal in cross-section at their outer end and cylindrical in cross-section where they extend through the slots or holes in the side walls 5 5 of the furnace-chamber. This furnace is shown as of square or rectangular form, with outer steel or iron plates 6, inclosing the brick or other refractory lining 5. The top stone 7 has a central hole of substantially the size of the pot-cavity and is beveled around the hole, as shown at 8, to make a neat fit with the correspondingly-beveled edge of the pot, thus making a joint which will substantially cut off the heated current from the glass at the drawing-point. The side walls are vertically slotted, as shown at 9, for a portion of their length, and between the slotted refractory lining and the slotted plates are placed shields 10, which have circular holes surrounding the cylindrical portions of the pot-trunnions extending through them. The octagonal or other angular-shaped end portions of the clay trunnions fit within corresponding sockets 11, secured to metal trunnions 12, which rest within vertically-slotted bearings 13 of vertically-sliding supports or standards 14. The bearings 13 are forked, and between the forks pinions 15 are secured to the trunnions, these pinions engaging short racks 16, which slide within the bottom of the forked portion and are actuated by links 17, pivotally connected with levers 18, secured to a common shaft 19. The construction is the same as to the operating mechanism at each side, and a single hand-lever 20 is used to rock the shaft 19, and thus turn the pot on its trunnions. The vertical standards 14 extend through dovetailed guideways 21 and at the lower end are connected by short links 22 with levers 23, pivoted to the sides of the furnace at 24. The links 22 are formed in two parts, with a turnbuckle connection between these parts having a right and left hand screw-thread, so that by turning the nut the link may be varied in length, thereby adjusting one side relatively to the other, so that the pot will be horizontal or will fit neatly against the sealing joint with the top stone. The levers 23 are provided at their ends with segmental racks 25, engaging segmental pinions 27 on a common shaft 26, which is rocked by a suitable hand-lever 28. By rocking this lever the pot may be raised and lowered within the furnace-chamber. The handle 28 has a spring-pressed catch 29, which engages teeth on the fixed segment 27', so that the pot may be locked in any desired position.

The furnace-body rests upon a suitable refractory foundation 30, carried on I-beams 31, extending across a lower cave or tunnel under the furnace, the foundation having a central eye 32 of cylindrical form, into which are directed a number of gas-jets 33. These gas-jets lead in from the sides and are thence bent upwardly, and the jet of gas and the flames suck the air upwardly into the eye, where it mixes and produces an intense combustion.

To cool the furnace-plate, I preferably provide an air-space between the outer plates and the brick lining, as indicated at 34 in Fig. 1, and to provide an outlet for the hot air and gases I provide slots 35 below the top stone and slots 36 along the lower edges of the side plates.

In order to take the weight of the shields 10 off from the pot-trunnions, I preferably provide vertical supports 37 on the bearings 13, to which are adjustably secured hooked rods 38, engaging eyebolts 39, secured to the tops of the shields.

In Fig. 3 I show the drawing of a cylinder from the glass in the upper pot-cavity, the cylinder 40 being formed from the depending end of the blowpipe 41. 42 is an annular shield, which I preferably employ; but this forms the subject-matter of my copending application, Serial No. 154,273, filed August 25, 1903.

In using the apparatus, the pot being heated and raised so that it fits against the top stone, molten glass is ladled or otherwise fed into the top pot-cavity. The drawing then proceeds, and during this drawing the heat in the furnace keeps the lower part of the glass-bath hot, this being desirable in order to keep the glass a uniform thickness by providing a lower reservoir of hotter glass. When the drawing operation is completed, the pot is first lowered, then turned over, and then raised to its upper position against the top stone. Another portion of molten glass is then fed into the upper cavity, and the drawing proceeds as before. During this drawing from the upper cavity the remaining portion of glass in the lower cavity is melted out and runs down from the sides, dropping on the sloping bottom 43 and thence running into the eye, whence it trickles down into the cave. It will be noted that the heat therefore serves not only to keep hot the lower portion of the bath from which the article is being drawn, but also serves to remove the chilled glass in the lower cavity and remove it so that it will not mix with and injure the next batch of fresh glass fed into this holding-cavity at the next drawing operation. One or more articles may be drawn from one cavity before turning over, though I prefer to feed in sufficient glass for one article and then turn over and melt out before another article is drawn.

The advantages of my invention result from the turning over of the pot and the melting out of the refuse glass, also from the double pot, which practically doubles the output, inasmuch as one article may be drawn from one cavity while the glass is being melted out of the other. The construction is simple, easily operated, and not liable to get out of order.

The pot may be of single form—that is, with only one cavity—or it may be provided with three or more cavities. The mechanism for raising and lowering and for turning may be varied, and many other changes may be made in the form and arrangement of the parts without departing from my invention.

I claim—

1. In glass-drawing apparatus, a pot, mechanism for turning the pot over, and means for melting out the remaining glass in the pot-cavity; substantially as described.

2. In glass-drawing apparatus, a furnace, a pot therein, mechanism for raising and lowering the pot, and mechanism for turning the pot over; substantially as described.

3. In glass-drawing apparatus, a furnace, a source of heat entering the lower part of the furnace-chamber, a pot within the chamber, mechanism for turning over the pot, and means for cutting off the heat from the drawing-point; substantially as described.

4. In glass-drawing apparatus, a furnace having a source of heat entering its bottom, a pot within the furnace, mechanism for raising and lowering the pot, mechanism for turning the pot, and means for cutting off the drawing-point from the heat; substantially as described.

5. In glass-drawing apparatus, a pot having a plurality of glass-holding cavities, and means for turning the pot; substantially as described.

6. In glass-drawing apparatus, a pot having oppositely-located upper and lower glass-holding cavities; substantially as described.

7. In glass-drawing apparatus, a plurality of glass-holding receptacles, mechanism for turning them, and a source of heat arranged to melt the glass out of a cavity after the termination of the drawing operation; substantially as described.

8. In glass-drawing apparatus, a pot having upper and lower cavities, mechanism for turning the pot, and a source of heat arranged to melt out the glass from the lower pot-cavity; substantially as described.

9. In glass-drawing apparatus, a reversible pot having upper and lower cavities, means for cutting off the heat from the drawing-point, a furnace inclosing the pot, and a source of heat entering the furnace, and arranged to melt out the glass from the lower cavity; substantially as described.

10. In a glass-drawing apparatus, a furnace containing a pot, mechanism for turning the pot, and means for melting out the remaining glass in the turned pot; substantially as described.

11. In glass-drawing apparatus, a turning pot, and mechanism for locking it in turned position; substantially as described.

12. A furnace, a pot therein having trunnions projecting through the side walls of the furnace, and mechanism engaging the projecting trunnions and arranged to turn the pot; substantially as described.

13. A furnace containing a pot, said pot having trunnions projecting through the side walls, mechanism engaging the trunnions for turning them, and mechanism for raising and lowering the pot; substantially as described.

14. A furnace containing a pot with a plurality of glass-holding cavities, said pot having projecting trunnions, and mechanism engaging the trunnions and arranged to turn the pot; substantially as described.

In testimony whereof I have hereunto set my hand.

LINCOLN $\overset{\text{his}}{\underset{\text{mark}}{\times}}$ THORNBURG.

Witnesses:
L. M. REDMAN,
H. M. CORWIN.